United States Patent [19]
Hayden

[11] 3,785,508
[45] Jan. 15, 1974

[54] APPARATUS FOR LAYING UP PLYWOOD PANELS

[75] Inventor: Roy E. Hayden, Grants Pass, Oreg.

[73] Assignee: SWF Plywood Company, Albany, Oreg.

[22] Filed: Oct. 27, 1972

[21] Appl. No.: 301,342

[52] U.S. Cl............. 214/6 M, 156/563, 214/6 DK, 270/58, 271/9
[51] Int. Cl........................................... B65g 57/06
[58] Field of Search.................. 156/563; 214/6 M, 214/6 FA, 6 D, 6 N, 6 DK, 6 H; 271/9, 64; 270/58

[56] References Cited
UNITED STATES PATENTS
| | | | |
|---|---|---|---|
| 2,010,732 | 8/1935 | Mandosic | 214/6 FA |
| 2,612,981 | 10/1952 | Alden, Jr. | 214/6 M |
| 3,443,706 | 5/1969 | Puhm | 214/6 D |
| 3,512,336 | 5/1970 | Rosecrans | 214/6 DK |
| 3,603,463 | 9/1971 | Billett et al. | 270/58 |

Primary Examiner—Robert J. Spar
Attorney—Kolisch, Hartwell & Dickinson

[57] ABSTRACT

Plywood lay-up apparatus including a plurality of vertically spaced veneer sheet conveyors having an adjacent set of discharge ends, and a lay-up table below the discharge ends of the conveyors. Lowering apparatus positioned over the lay-up table and adjacent the discharge ends of the conveyors is adapted to receive veneer sheets from the conveyors, with the sheets held one above the other in the relative positions they are to have in a formed panel, and to lower the sheets onto the lay-up table. Sheet chargers are provided at the discharge ends of the conveyors for controlling the discharge of sheets onto the lowering apparatus. A core sheet supply is operable to intersperse glue-coated core sheets between selected pairs of veneer sheets as they are lowered to the table.

11 Claims, 7 Drawing Figures

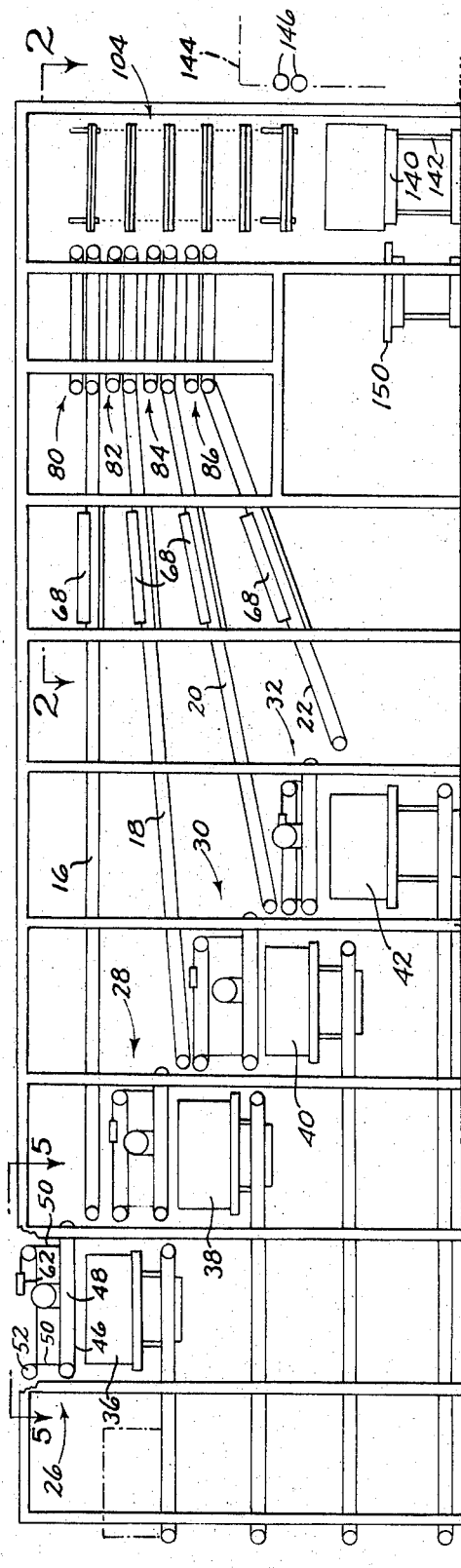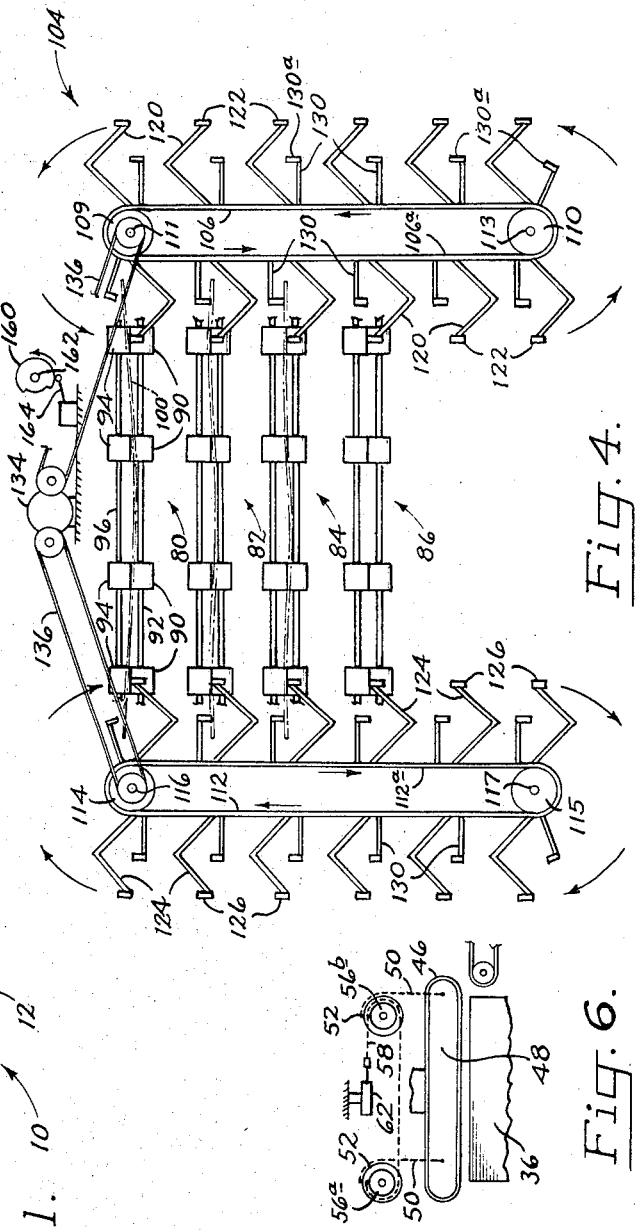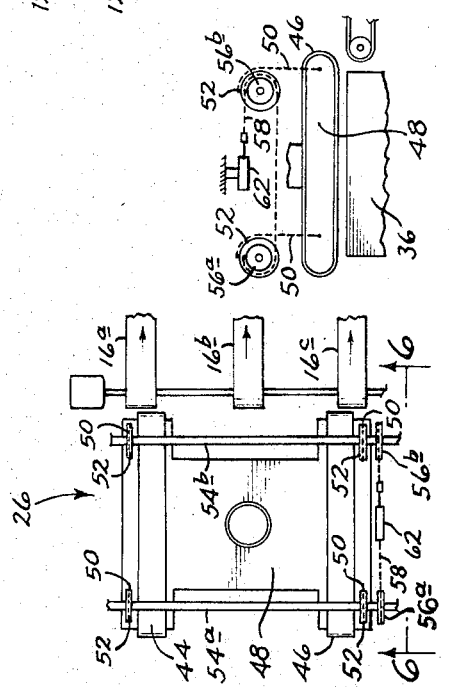

APPARATUS FOR LAYING UP PLYWOOD PANELS

SUMMARY AND BACKGROUND OF THE INVENTION

This invention relates to improved apparatus for laying up plywood panels.

In the design of plywood lay-up apparatus, several factors must be considered; such as the speed of operation obtainable from the apparatus, the overall size of the equipment with regard to the floor space it will require, and the quality of plywood which can be produced by the apparatus.

Various plywood lay-up devices have been devised in the past. For the most part, however, such devices have been so designed that they either had to sacrifice production speed to achieve high quality plywood, or, in the alternative, they have had to sacrifice quality to achieve speed. Further, such devices often handle veneer in such a way that the sheets are susceptible to damage before and during lay-up.

A general object of the present invention is to provide novel plywood lay-up apparatus which is operable to produce high quality plywood panels rapidly and efficiently.

Another object is to provide novel plywood lay-up apparatus which is operable to produce plywood panels with minimal damage to individual veneer sheets fed through the apparatus.

Yet another object is to provide novel plywood lay-up apparatus which is relatively compact, yet which provides a position for a workman adjacent a final lay-up region in which he is able to check visually, and physically reach, different portions of veneer sheets and core sheets as they are laid, thus permitting him to correct defects in the sheets to produce high quality plywood.

More specifically, an object is to provide novel plywood lay-up apparatus which includes a plurality of vertically spaced conveyors for carrying back, center and face veneer sheets in a substantially common direction toward an adjacent set of discharge ends for the conveyors, charging devices at the discharge ends of the conveyors for controlling the discharge of veneer sheets therefrom, and a lay-up table below the discharge ends of the conveyors. Lowering means, having a plurality of vertically spaced veneer support flights thereon, is positioned adjacent the discharge ends of the conveyors and over the lay-up table. The lowering means is operable to receive veneer sheets from the charging devices with the veneer sheets spaced one above the other in the relative positions they are to have in a formed panel and lower the same onto the lay-up table. Each charging device associated with a conveyor is operable to receive a veneer sheet, and hold the same until a predetermined number of the other charging devices have been filled with veneer sheets. After such predetermined number of charging devices have been filled they are operated substantially simultaneously to discharge their veneer sheets onto the lowering means for lowering successively onto the lay-up table. A core sheet supply adjacent the lay-up table is operable to intersperse glue-coated core sheets between selected pairs of veneer sheets as they are lowered to the lay-up table. With the ends of the conveyors and the charger devices being elevated above the lay-up table, a workman is able to stand therebeneath, alongside the lay-up table to inspect and correct defects in veneer sheets and core sheets laid thereon.

DRAWINGS

These and other objects and advantages will become more fully apparent as the following description is read in conjunction with the drawings, wherein:

FIG. 1 is a schematic side elevation view of apparatus constructed according to an embodiment of the invention;

FIG. 4 is a view taken generally along the line 4—4 in FIG. 3,

FIG. 5 is an enlarged view taken generally along the line 5—5 in FIG. 1;

FIG. 6 is a view taken generally along the line 6—6 in FIG. 5; and

DETAILED DESCRIPTION OF AN EMBODIMENT OF THE INVENTION

Figure 2:
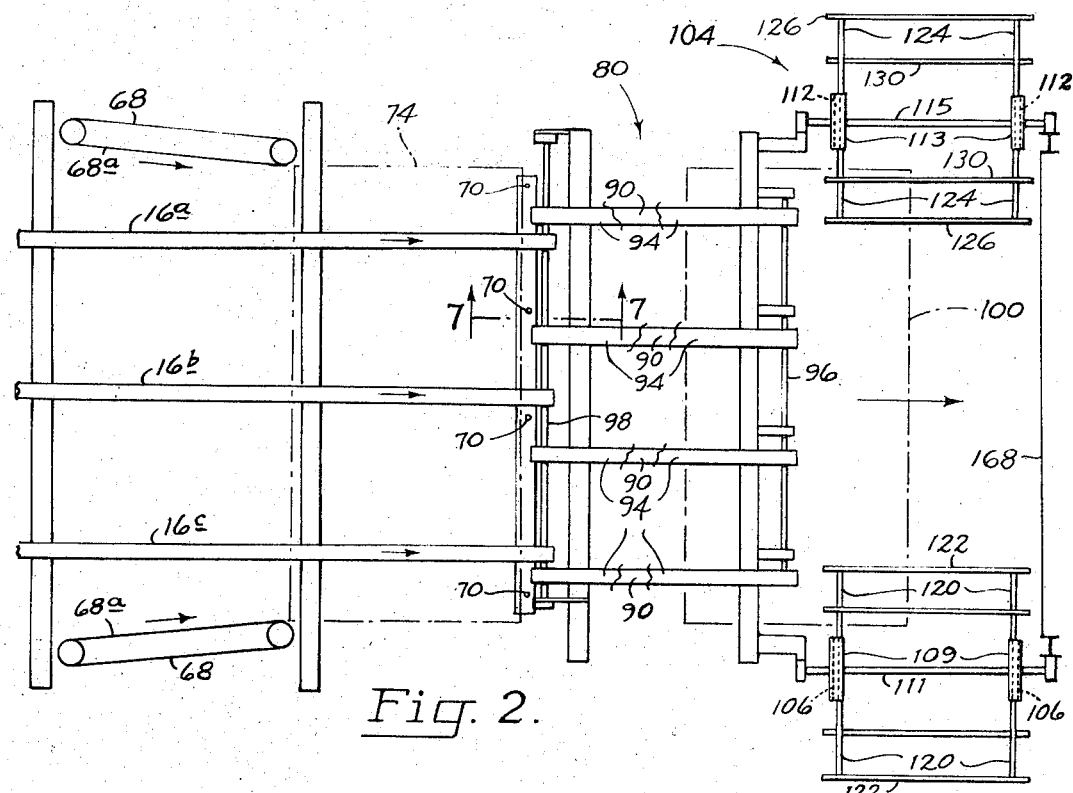
FIG. 2 is an enlarged top plan view of the downstream end of the apparatus taken generally along the line 2—2 in FIG. 1.

Referring now to the drawings, and first more specifically to FIG. 1, at 10 is indicated generally apparatus constructed according to an embodiment of the invention. The apparatus includes a main support frame 12 on which are mounted a plurality of vertically spaced veneer sheet conveyors 16, 18, 20, 22. Each conveyor, as illustrated by the downstream end portion of conveyor 16 shown in FIG. 2, includes a plurality of elongated, endless conveyor belts, as illustrated at 16a, 16b, 16c. The belts in each conveyor are disposed with their upper reaches occupying a substantially common plane and are driven under power in a common direction, to the right in FIGS. 1, 2 and 3. The conveyors are of such width that they are operable to convey an elongated veneer sheet therealong with the length of sheet extending transversely of the path of the conveyor.

A plurality of veneer sheet feeders, indicated generally at 26, 28, 30, 32 in FIG. 1, are mounted on frame 12 adjacent the upstream, or left, ends of conveyors 16, 18, 20 and 22, respectively, and are operable to feed veneer sheets onto the conveyors.

Underlying feeders 26, 28, 30, 32 are stacks of veneers sheets 36, 38, 40, 42, respectively, each of which is supported on a scissor lift mechanism mounted on frame 12. Stack 36 may be a stack face veneer sheets, stacks 38, 40 may be stacks of center veneer sheets, and stack 42 may be a stack of back veneer sheets. The grain of such veneer sheets extends generally in a direction lengthwise of the sheets. The veneer sheets in each of the stacks preferably are disposed with their long axes, and thus the grain, extending across the apparatus, transversely of the paths of the conveyors.

Each of the sheet feeders, and referring specifically to feeder 26 illustrated in FIGS. 1, 5, and 6 includes a pair of elongated, endless, laterally spaced, power-driven, perforate vacuum belts 44, 46 trained over a vacuum chamber 48. The vacuum chamber is connected to exhaust means (not shown) which is operable to reduce the pressure in the vacuum chamber. Each of belts 44, 46 has openings extending therethrough which communicate with openings in the underside of chamber 48. A veneer sheet pressed against the underside of the belts 44, 46 will be held thereagainst by the pressure differential between the reduced pressure in the chamber and atmospheric pressure.

The vacuum chamber is suspended adjacent its four corners on the lower ends of a plurality of chains 50 (see FIGS. 5 and 6). Chains 50 are connected at their upper set of ends to a plurality of sprockets 52 secured to horizontal shafts 54a, 54b, which are supported on frame 12 for rotation above the vacuum chamber. Shafts 54a, 54b have sprockets 56a, 56b secured adjacent one set of their ends, respectively. An elongated drive chain 58 is secured at one of its ends to sprocket 56a and is trained around a portion thereof, extends to sprocket 56b and is trained in a reverse curve around a portion thereof, and is secured at its other end to the rod end of a ram 62 mounted on frame 12.

Explaining the operation of such mounting for the sheet feeder, with ram 62 contracted the shafts and chains just described suspend feeder 26 a short distance above the top sheet in stack 36. Extension of ram 62 permits sprockets 56a, 56b and shafts 54a, 54b to rotate in such a direction that chains 50 are lowered from their associated sprockets 52 to lower vacuum belts 44, 46 against the top sheet on stack 36. With the exhaust means for the sheet feeder operating, the top sheet is held against the vacuum belt, and retraction of ram 62 raises the vacuum belts and such sheet to a position above the stack.

Belts 44, 46 are powered for movement whereby their lower reaches move to the right, in a downstream direction, to feed a veneer sheet held thereon onto conveyor 16. The scissor lift mechanisms on which the stacks of veneer are supported are operable to raise the stacks intermittently as sheets are removed therefrom to maintain the top of each stack in a predetermined position relative to its associated feeder.

Referring now to FIG. 2, adjacent the downstream end of each conveyor is aligning means including a pair of opposed, laterally spaced, traveling straight edges 68 and a plurality of vertically shiftable pin stops, also referred to as fence structure, 70. Each traveling straight edge 68, comprises an elongated, endless, power-driven conveyor belt having an inwardly facing, upright aligning reach 68a. The upstream, or left, ends of the straight edges, as illustrated in FIG. 2, are spaced apart laterally of the path of the conveyor a distance greater than the length of a veneer sheet to be carried therealong. A veneer sheet carried by conveyor 16 is illustrated in dot-dashed outline at 74. On progressing in a downstream direction, opposed reaches 68a converge until they are spaced apart a distance approximately equal to the length of a veneer sheet. The downstream ends of reaches 68a are disposed substantially along lines paralleling the path of the conveyor with which the ends of a veneer sheet are to be aligned. Reaches 68a are driven under power at approximately the same speed, and in the same direction, as the belts on their associated conveyor and act to align a veneer sheet laterally of the conveyor as a sheet is conveyed therealong.

Pin stops 70, (see FIGS. 2 and 7), are upright, elongated, vertically shiftable pins which are shiftable concurrently between a lowered, or inoperative, position below the upper reaches of the belts on their associated conveyor, and a raised, or operative, position projecting upwardly into the path of a veneer sheet carried on the conveyor. As is seen in FIG. 2, pins 70 are so positioned that their sides facing in an upstream direction relative to the conveyor are aligned along a line extending normal to the path of the conveyor. The pin stops (as seen in FIG. 7), when raised, are operable to engage the leading edge of a veneer sheet, such as sheet 74, thus to stop the sheet with its leading edge disposed substantially normal to the path of the conveyor.

Sensing means of a conventional type known in the art may be associated with each set of pin stops to sense when a veneer sheet is stopped thereby on the conveyor. Such information may be relayed to means controlling operation of the conveyor to stop the same to prevent following veneer sheets on the conveyor from being conveyed onto or under the stopped sheet.

A plurality of vertically spaced charging devices 80, 82, 84, 86 are disposed at the downstream ends of conveyors 16, 18, 20 and 22, respectively. The charging devices are similar in construction, and thus only that indicated at 80 will be described in detail.

Figures 3, 7:
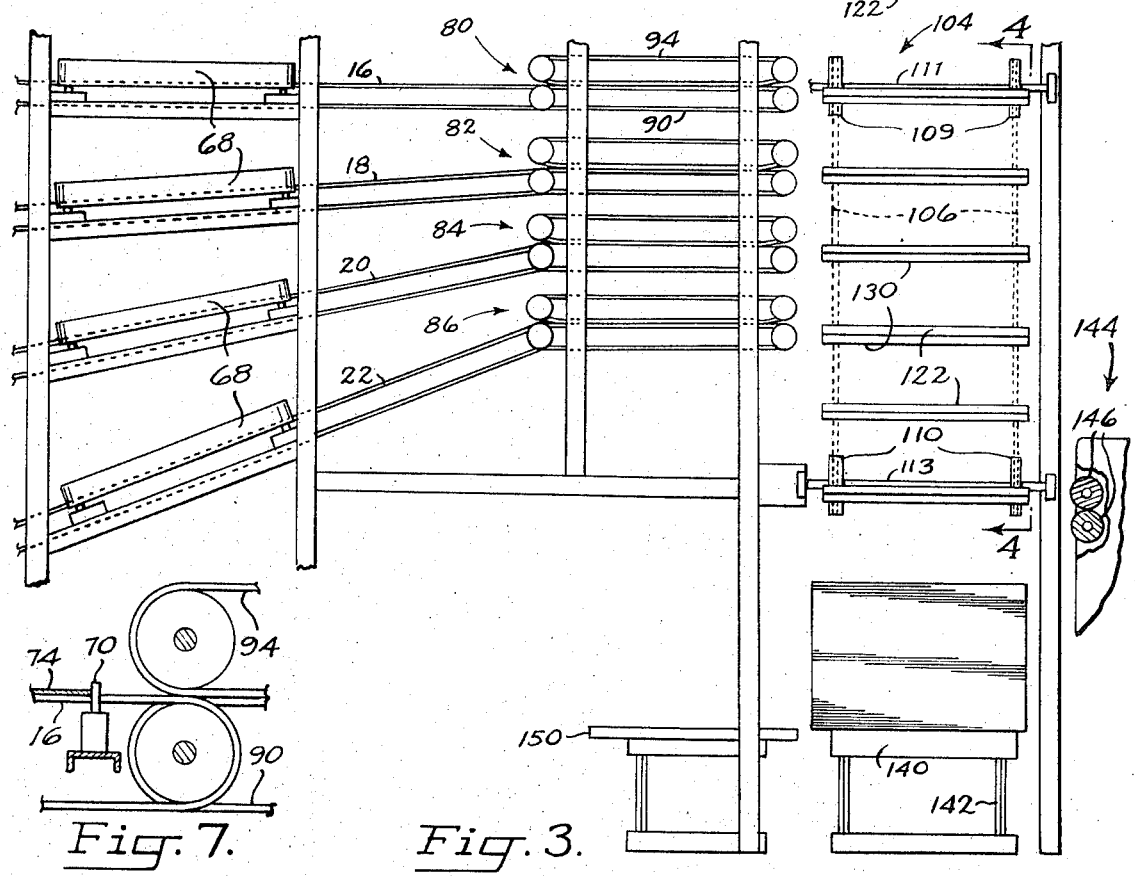
FIG. 3 is a side elevation view of the apparatus illustrated in FIG. 2.
FIG. 7 is an enlarged view taken generally along the line 7—7 in FIG. 2.

Referring to FIGS. 2, 3 and 4, charging device 80 includes a plurality of endless, elongated veneer support belts 90 trained, adjacent their opposite set of ends, about pulleys mounted on common horizontal shafts, such as that illustrated at 92. The upper reaches of belts 90 occupy a common substantially horizontal plane joining with the plane occupied by the downstream ends of the upper reaches of the belts of conveyor 16. Overlying each of belts 90 is an elongated, endless bearing belt 94. Opposite ends of belts 94 are trained about pulleys mounted on shafts 96, 98. The bearing belts have lower reaches which occupy a substantially horizontal plane adjacent the upper reaches of belts 90. Belts 90, 94 are driven under power by interruptible drive means (not shown) whereby the upper reaches of belts 90 and the lower reaches of belts 94 travel in a downstream direction (to the right in FIGS. 2 and 3) at substantially sychronized speeds. The belts are adapted to receive a veneer sheet therebetween from their associated conveyor, and, on actuation of their drive means, draw the sheet fully into the region between belts 90, 94.

Sensing means (not shown) of a conventional type known in the art is associated with each charging device and is operable to sense when a veneer sheet has been drawn fully into the charging device and stops the belts to hold the sheet therein. A sheet is held in a charging device until a predetermined number of the other charging devices have been filled. The drive means for the belts then may be operated to discharge veneer sheets from the charging devices substantially simultaneously to the right, as illustrated by veneer sheet 100 shown in dot-dashed outline in FIG. 2.

Disposed adjacent the downstream, or discharge, ends of the charging devices is lowering means indicated generally at 104. As is best seen in FIGS. 2, 3 and 4, the lowering means includes a pair of endless, elongated, spaced apart chains 106 adjacent one side of the conveyor path and a similar pair of chains 112 adjacent the opposite side of the path. Chains 106 are trained at their upper and lower sets of ends, respectively, over sprockets 109, 110 mounted on a pair of vertically spaced, substantially horizontal shafts 111, 113. Shafts 111, 113 extend substantially in the direction of the conveyors, with shaft 111 at approximately the elevation of conveyor 16 and shaft 113 disposed below the elevation of the discharge end of conveyor 22.

Chains 112 are trained over vertically spaced sprockets 114, 115 mounted on vertically spaced shafts 116, 117. The inwardly facing vertical reaches 106a, 112a of the chains (see FIG. 4) are spaced apart laterally a distance greater than the length of a veneer sheet, as illustrated in relation to veneer sheet 100 in FIGS. 2 and 4.

A plurality of veneer-receiving support arms 120 are secured to and project outwardly from chains 106. Elongated support members 122 extend between and are secured adjacent their opposite sets of ends to arms 120 on chains 106. The arms are spaced apart vertically on the chains a distance substantially equal to the vertical spacing between charging devices 80, 82, 84 and 86. A similar set of support arms 124, and support members 126 extending therebetween, are secured to and project outwardly from chains 112. Arms 124 similarly are spaced apart a distance substantially equal to the vertical spacing between the charging devices.

A plurality of hold down arms 130 are secured to and project outwardly from chains 106, 112 between the support arms. The hold down arms have securing portions 130a disposed between members 122, 126 and their respective chains as seen in FIG. 4.

Interruptible drive means, including a motor 134 and drive chains 136, (see FIG. 4), is operatively connected to chains 106, 112 in such a manner that chains 106, 112 may be driven at synchronized speeds with their inwardly facing reaches 106a, 112a, moving downwardly and with the upper, or support, surfaces of opposing support members 122, 126 on arms 120, 124 maintained substantially parallel to and in a common horizontal plane with each other (see FIG. 4).

Members 122, 126 on arms 120, 124 are adapted to be moved by their drive means into registry with the charging devices, as seen in FIG. 4, and to receive veneer sheets discharged from the charging devices. Members 122, 126 support the sheets at regions spaced inwardly on the sheets from their opposite end edges, as seen in FIG. 4, and on operation of motor 134 lower the sheets.

As has been mentioned previously, the veneer sheets preferably are carried by the conveyors with the grain of the sheets extending laterally of the conveyor. Since veneer sheets generally have the greatest resistance to bending in a direction paralleling the grain thereof, the veneer sheets thus are discharged onto the support arms in the position in which they are best able to support themselves in the region between the opposed sets of support arms.

Should veneer sheets be encountered which are too thin to support themselves, hold down members 130 engage the top surfaces thereof in regions between members 122, 126 and the end edges of the sheets to prevent the same from sagging, or bowing downwardly, excessively at their centers.

A panel lay-up table 140 is mounted on a scissor lift mechanism 142 beneath the lowering means to receive veneer sheets lowered thereby. The scissor lift mechanism permits the table to be lowered as additional veneer sheets are laid thereon.

A conventional core supply means, indicated generally at 144, is illustrated schematically in FIGS. 1 and 3. Such core supply means is of the type which is operable to apply a glue coating to opposite faces of a sheet of core pieces, which then may be discharged by rollers 146 of the core supply means into the region over lay up table 140.

A platform 150 adjacent lay-up table 140 provides a place for a workman at one side of the lay-up table. The platform is positioned so that the workman is on the long side of the table and the stack of plywood formed thereon so that he is able to reach fully across the normal four foot width of a sheet of plywood laid up on the table to inspect and correct defects in the veneer or core sheets.

The sequence of operation of the major component devices in the apparatus is dictated by control means including a plurality of rotating cams, such as that illustrated generally at 160 in FIG. 4, mounted on a common rotating shaft 162. Each cam has a switch, such as that illustrated generally at 164, associated therewith which is opened and closed at intervals determined by the shape of the cam and the speed of rotation of the cams and shaft 162. Each cam-operated switch is operatively connected to a component device in the apparatus (i.e., the sheet feeders, charging devices, lowering means, core sheet supply) for controlling the sequence of operation of said devices. The number and shapes of the cams used will be determined by the number of plies of veneer and core to be laid up to form each panel. The speed of rotation of shaft 162 and the cams determines the general speed of operation of the apparatus.

Describing now the operation of the apparatus to manufacture five ply plywood, sheet feeder mechanism 26 is operated to lift a face veneer sheet from stack 36 and place it on conveyor 16, sheet feeder 28 is operated to lift a center veneer sheet from stack 38 and place it on conveyor 18, and sheet feeder 32 is operated to lift a back veneer sheet from stack 42 and place it on conveyor 22. Operation of conveyors 16, 18, 22 then carries the face, center and back veneer sheets therealong to the right in FIG. 1, and between aligning traveling straight edges 68, to properly position the veneer sheets laterally of the conveyors. Pin stops 70 associated with each conveyor are raised into the path of the veneer sheets, whereby the leading edges of the veneer sheet are properly aligned. When the veneer sheets have been properly aligned, the pin stops are lowered and the veneer sheets are fed into charging devices 80, 82, 86. Sensors at each of the charging devices operate to stop a charging device when a veneer sheet is properly positioned therein.

While the veneer sheets are being fed to the charging devices the chains of the lowering means are driven to place them in a position in which a set of support arms 120, 124 and support members 122, 120 carried thereby are in registry with the discharge ends of the charging devices. When they are thus properly positioned the chains are stopped automatically.

After the face, center and back veneer sheets all have been fed fully into their respective charging devices and arms 120, 124 have been properly positioned adjacent the discharge ends of the charging devices, the charging devices are operated at a relatively fast speed to discharge the veneer sheets therefrom and onto support members 122, 126. A backstop 168 seen in FIG. 2, prevents the veneer sheets discharged onto the arms from passing thereover. The veneer sheets thus discharged onto the arms of the lowering means are supported by said arms in vertically spaced relation to each other, as seen in FIG. 4, and in the relative positions they are to have in an assembled panel.

The drive means for chains 106, 112 then is operated to lower the arms on inwardly facing reaches 106a, 112a of the chains, thus to lower the veneer sheets directly onto the panel lay-up table 140. As the lowest set of support arms carrying a veneer sheet arrive at the bottom of their respective reaches they are swung around the undersides of sprockets 110, 115 and thus are moved laterally outwardly from the end edges of the veneer sheet and drop it to the table.

As the lowering means lowers the back veneer sheet onto the lay-up table a sheet of core pieces coated with glue on both of its surfaces is discharged from core sheet supply means 144 to a position over the back veneer sheet. Further lowering of the support arms lowers the center veneer sheet onto the previously laid glue-coated core sheet, and then a second sheet of core pieces coated with glue on both of its faces is discharged thereonto by the core supply means. Finally, the lowering means lowers the face veneer sheet onto the second core sheet. In this way, a five ply plywood panel is laid up.

Throughout this operation a workman standing on platform 150 is able to view the veneer sheets and core sheets as they are placed on the lay up table and to correct defects therein. The workmen is positioned at the long side of the stack of plywood panels laid up and thus is able to reach fully across the usual four foot width of the stack to patch defective sheets.

While the above-described procedure has been occurring, another set of veneer sheets to form a subsequent panel are fed to the appropriate ones of the conveyors and conveyed through the aligning means to the charging devices. Pin stop 70 hold these subsequent veneer sheets against movement into the charging devices until such time as the charging devices have emptied onto the lowering apparatus. Once the charging devices have been emptied the next successive group of veneer sheets is fed thereto and is held until the lowering means is in position to accept this next group of sheets.

Although the operation of the apparatus has been described for producing five-ply plywood, it should be understood that it is operable to produce plywood containing any desired number of plies. This is accomplished by varying the cams 160 and switches 164 which control the sequence of operation of the apparatus.

With such apparatus veneer sheets can be picked up from their appropriate stacks and carried along the veneer conveyors while previous veneer sheets are aligned, fed to the charger, discharged onto the lowering apparatus and lowered onto the lay-up table. Thus a substantially continuous flow of veneer sheets is provided, with the veneer sheets disposed in the general relation that they are to have in a finally layed up panel.

With such apparatus the veneer sheets are carried from the stacks to the lay-up table in the same general orientation they are to have in the finally formed panel and the sheets are maintained segregated from each other until they are actually layed up. Further, the sheets are lowered in substantially flat positions onto the lay-up table. These, and other features of the apparatus are instrumental in minimizing damage to the individual veneer sheets and producing high quality plywood at relatively high production rates.

While a preferred embodiment of the invention has been described herein, it should be apparent to those skilled in the art that variations and modifications are possible without departing from the spirit of the invention.

It is claimed and desired to secure by Letters Patent:

1. Apparatus for laying up plywood panels comprising
a plurality of vertically spaced, elongated conveyors having an adjacent set of discharge ends, operable to convey veneer sheets therealong toward said discharge ends of the conveyors,
a lay-up table disposed below said discharge ends of the conveyors,
lowering means, including a plurality of vertically shiftable veneer-support flights, disposed above said table and adjacent the discharge ends of said conveyors adapted to receive veneer sheets discharged from said conveyors with such sheets disposed on said flights in vertically spaced relation in the relative positions they are to have in an assembled panel, and operable to lower such sheets successively onto said table, and
core sheet supply means operable to intersperse core sheets between selected pairs of veneer sheets lowered to said table.

2. The apparatus of claim 1, wherein said veneer-support flights of the lowering means are spaced apart vertically a distance substantially equal to the vertical spacing between the discharge ends of said conveyors, and which further comprises drive means connected to said flights, operable intermittently to position selected ones of said flights substantially in register with said discharge ends of the conveyors.

3. The apparatus of claim 1, wherein said lowering means comprises a pair of chains having substantially parallel, opposed upright reaches disposed on opposite sides of said conveyors, and said flights include a plurality of support arms mounted on said reaches with the arms on one reach projecting toward the arms on the other reach, and which further comprises drive means operatively connected to said chains for producing synchronized vertical movement of said reaches with the arms on one reach in horizontal alignment with mating arms on the other reach.

4. The apparatus of claim 3, wherein a support arm has a sheet-engaging portion thereon adapted to engage the underside of a veneer sheet in a region spaced inwardly on the sheet from an edge of the sheet, and which further comprises a hold down member mounted on said reach of chain projecting outwardly therefrom above a support arm.

5. The apparatus of claim 4, wherein a hold down member has a sheet-engaging portion disposed intermediate the sheet-engaging portion of its associated support arm and the chain.

6. The apparatus of claim 1, wherein a conveyor includes charging means at its discharge end operable to receive and hold a veneer sheet, and actuatable intermittently to discharge such veneer sheets onto said lowering means.

7. The apparatus of claim 6, wherein a charging means comprises a power-driven veneer support belt having an elongated upper reach occupying a substantially horizontal plane, and a power-driven bearing belt having an elongated, lower reach overlying said upper reach of the support belt, said veneer support belts and bearing belts being adapted to be driven at substantially common speeds.

8. The apparatus of claim 6, which further comprises aligning means associated with a conveyor, including fence structure in a region upstream on the conveyor from its said charging means shiftable selectively between an operative position extending into the path along which a veneer sheet may be carried on the conveyor, and an inoperative position where said path is cleared.

9. The apparatus of claim 1, which further comprises aligning means associated with each of said conveyors operable to align a veneer sheet carried therealong in a predetermined orientation relative to said conveyor prior to discharging the same onto said lowering means.

10. The apparatus of claim 9, wherein said aligning means comprises fence structure shiftable selectively between an operative position extending into the path along which a veneer sheet may be carried on the conveyor, and an inoperative position where said path is cleared.

11. Apparatus for laying up plywood panels comprising a plurality of vertically spaced, elongated conveyors having an adjacent set of discharge ends, operable to convey veneer sheets individually and in succession therealong toward said discharge ends, each conveyor including charging means at its discharge end, each charging means being operable to receive and hold a veneer sheet therein until a predetermined number of the others of said charging means have been filled, and the charging means of several conveyors being actuatable to discharge such veneer sheets simultaneously therefrom, a lay-up table disposed below said discharge ends of the conveyors, lowering means disposed above said table and adjacent the discharge ends of said conveyors including a plurality of vertically shiftable veneer-support flights spaced apart vertically a distance substantially equal to the vertical spacing between said charging means, said flights being adapted to receive veneer sheets discharged from said charging means with such sheets disposed on the flights in vertically spaced relation in the relative positions they are to have in an assembled panel, drive means connected to said flights operable intermittently to position said flights substantially in registery with said charging devices to receive veneer sheets therefrom and thereafter to lower the same toward said lay-up table, and core sheet supply means operable to intersperse core sheets between selected pairs of veneer sheets lowered to said table.

* * * * *